Aug. 31, 1943.                    D. G. C. LUCK                    2,328,476
                              OMNIDIRECTIONAL RANGE
                    Filed Oct. 29, 1940            3 Sheets-Sheet 1
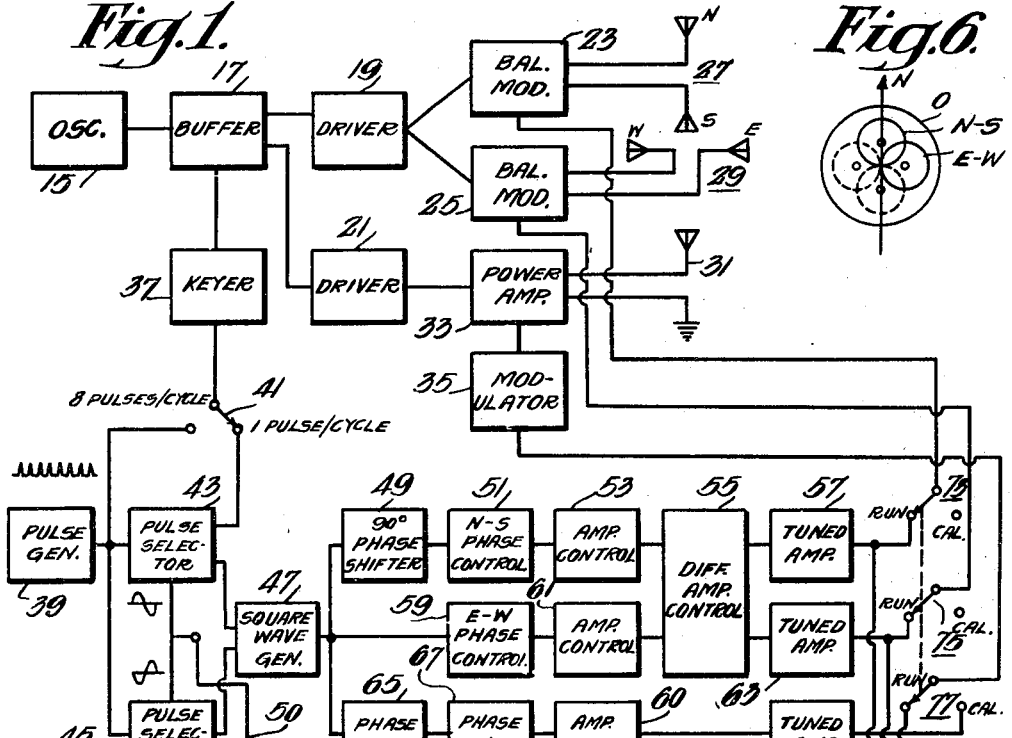
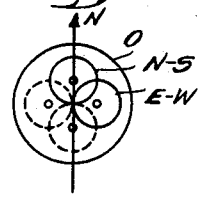
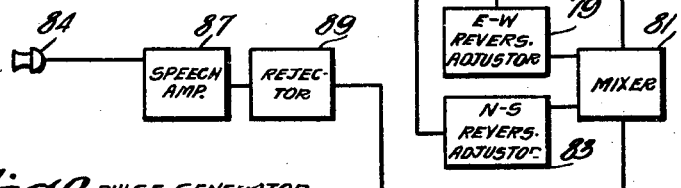
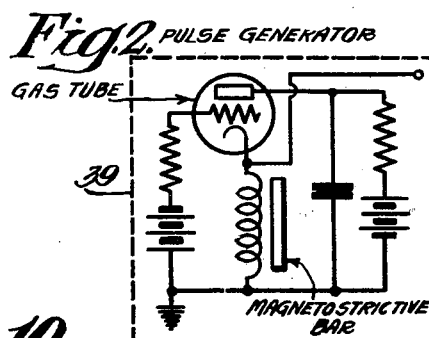
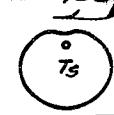
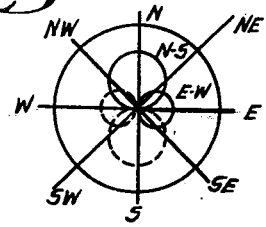
Inventor
David G. C. Luck
By
Attorney

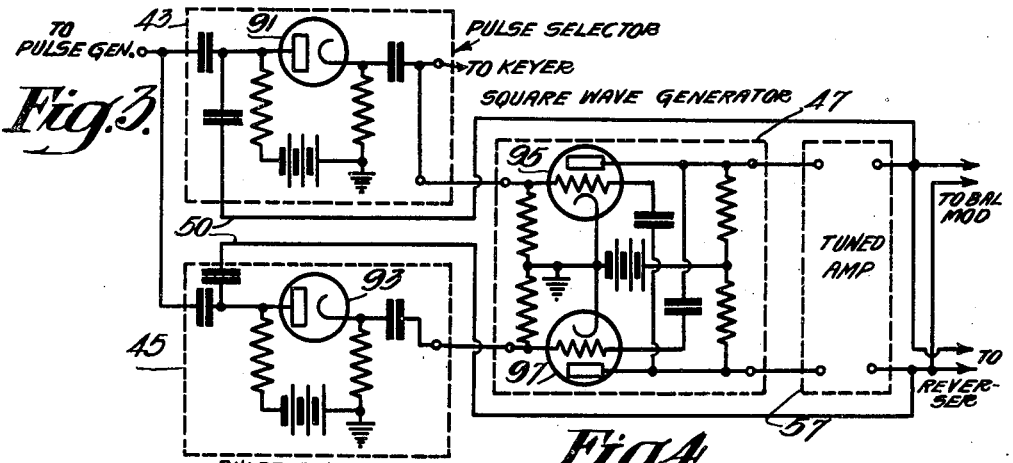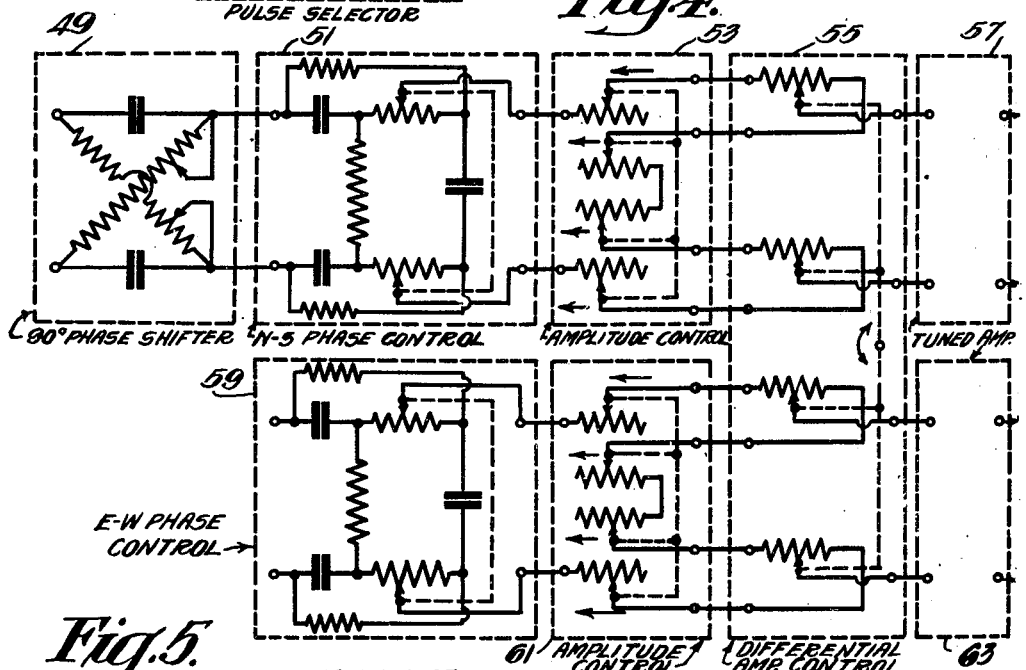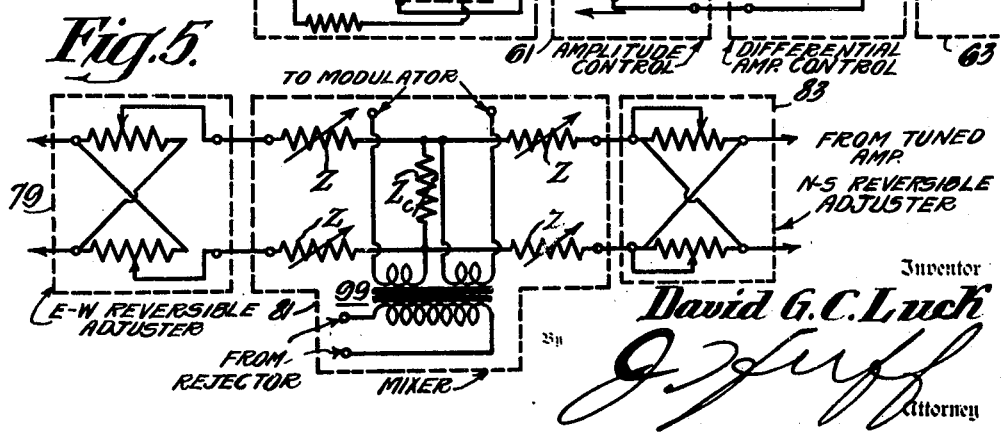

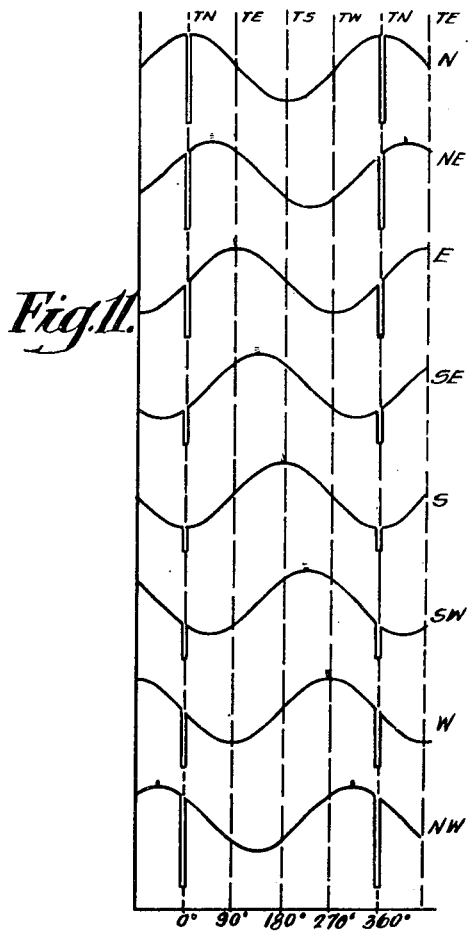
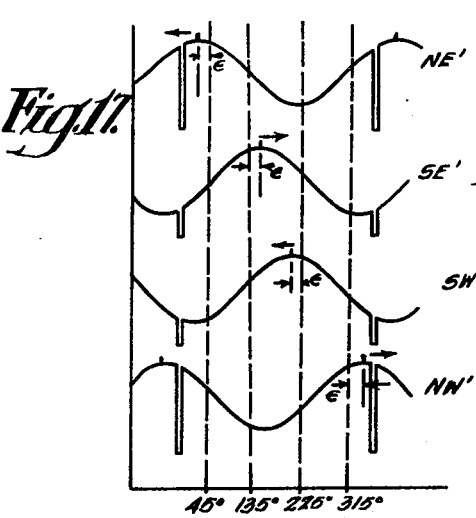
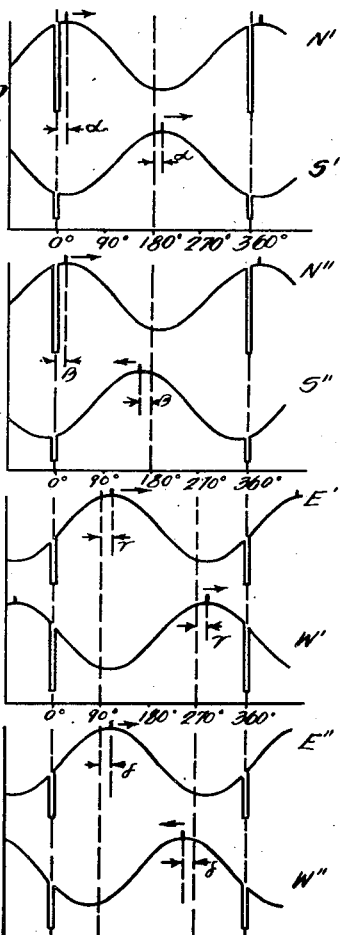
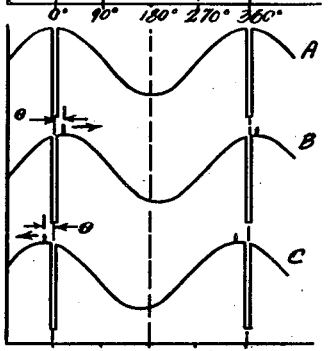

Patented Aug. 31, 1943

2,328,476

UNITED STATES PATENT OFFICE 2,328,476

OMNIDIRECTIONAL RANGE

David G. C. Luck, Haddon Heights, N. J., assignor to Radio Corporation of America, a corporation of Delaware Application October 29, 1940, Serial No. 363,249

16 Claims. (Cl. 250—11)

This invention relates to omnidirectional radio ranges of the type described and claimed in Patent No. 2,208,376 which issued to D. G. C. Luck, July 16, 1940, on an application filed July 28, 1937.

Briefly, the system to which the present invention relates involves a radio beacon in which a rotating directive field provided with a reference mark determines the bearing of a receiver with respect to the beacon. A receiver suitable for use with a radio range of this type is also described in the aforementioned patent. The rotating radio beacon is obtained by combining the uniform radiation field of a centrally located antenna with a pair of figure-of-eight fields produced by a pair of Adcock antennas, or the like, energized by side band frequency currents, the modulating voltages of which are in phase quadrature. In the previous arrangement the modulating voltage was obtained directly from the 60 cycle power lines. The use of the power line to obtain modulation is not desirable, however, since the supply line frequency is inconveniently close to the propeller blade frequency of most aircraft, and is insufficiently constant. It is therefore an object of this invention to provide a source of modulation frequency for a radio range which is independent of changes in amplitude and frequency of the commercial power line, and which is characterized by high stability.

In the above mentioned patent a system for checking the calibration of a receiver is described which comprises radiating four equally spaced calibrating pulses corresponding to the four quadrant directions north, east, south and west, of the rotating field. These calibrating pulses must be accurately timed and must bear a definite relation to the keying impulse by means of which the reference mark referred to above is radiated. It is therefore a further object of this invention to provide a source of voltage for an omnidirectional range which includes a plurality of accurately timed reference pulses for calibration, one of which is utilized during normal operation to key the radiated fields at fixed intervals to produce a reference mark.

It will be appreciated that if the timing of the reference mark is to correspond with the exact instant that the rotating radio field points due north, for example, that adjustments must be provided to control the modulation circuits so as to suitably adjust the phase of the modulating voltage to produce this relation. In addition, slight discrepancies in the relative amplitudes of the radiated fields, and in the physical arrangement of the directional antennas, as well as dissymmetries in the electrical circuit and the presence of nearby obstacles cause the phase of the rotating field, measured from a given point, to be slightly advanced or retarded in time from the proper phase, with the result that the indication at the receiver will be in error by a like amount. Where the range is operated at high frequencies it is not easy to eliminate these errors by a physical adjustment of the system. Accordingly, it is a still further object of this invention to provide means for adjusting the relative amplitudes of the radiated fields and for advancing or retarding the phase of the rotating field in different directions about its axis of rotation. That is, the slightly non-uniform rate of rotation is corrected so that the phase at the four cardinal points of the compass, north, east, south and west, for example, is correct, and, in addition, the error at the four intercardinal points, northeast, southeast, southwest, and northwest is minimized.

This invention will be better understood from the following description when considered in connection with the accompanying drawings in which Figure 1 is a schematic diagram of an omnidirectional range and a source of modulating voltages in accordance with this invention; Figure 2 is a circuit diagram of a pulse generator; Figure 3 is a circuit diagram illustrating a pulse selector and a square wave generator; Figure 4 is a schematic diagram of the phase shifting, phase control and amplitude control devices utilized in this invention; Figure 5 is a schematic diagram of a reversible phase adjuster and mixer; and Figures 6 to 18, inclusive, are curves explaining the operation of this invention.

The upper section of Fig. 1 shows in block diagram form a conventional omnidirectional range of the type described in the patent referred to above. Radio frequency energy from an oscillator 15 is fed through a buffer 17 to a pair of amplifiers 19 and 21. Output from the first driver 19 is fed into the input circuits of a pair of balanced modulators 23 and 25. The outputs of these balanced modulators are coupled, respectively, to the north-south antenna 27 and the east-west antenna 29. Output from the driver 21 is coupled to a centrally located omnidirectional antenna 31 through a power amplifier 33. The power amplifier is connected to a modulator 35 by means of which the energy radiated by the omnidirectional antenna 31 may be modulated. A keyer 37 for momentarily interrupting the radio frequency energy fed into the radiating system is connected to the buffer 17.

Operation of the beacon

In the operation of the foregoing circuit, the balanced modulators 23 and 25 supply radio frequency currents modulated at a convenient frequency, say 100 cycles, which may be termed side band currents, to the bidirectional antennas 27 and 29, respectively. The modulating voltages for the balanced modulators are obtained from the modulation source which will be subsequently described in detail, for the present it being sufficient to understand that the modulating voltages applied to the two balanced modulators are in phase quadrature. The radio frequency currents in the two antennas of each pair will be in phase opposition, and the modulated carrier frequency currents in the north antenna, for example, will be in phase with the modulated carrier frequency currents in the east antenna.

The carrier frequency currents in the central or omnidirectional antenna 31 are adjusted to be in quadrature phase with the modulated carrier frequency currents in the four directional antennas. As a result, the fields established by the currents in the bidirectional antennas are each of the conventional figure-of-eight type, the amplitudes of these fields varying in accordance with the modulating voltages to produce a resultant figure-of-eight field which rotates about the common center of the four antennas at the frequency of the modulating source. The omnidirectional antenna 31 is energized by carrier frequency currents which establish a radio frequency field having a uniform or normal circular pattern. This field is in phase with the rotating bidirectional or figure-of-eight field, and establishes a resultant field which has a substantially cardioid shape. However, it is preferable to have the uniform circular field of greater amplitude than the rotating field so that the cardioid minimum is not reduced to zero. The cardioid field rotates about the central antenna at the frequency of the modulating voltage. Figures 7 to 10 illustrate one cycle of rotation of the cardioid field, the field being shown at successive times, a quarter cycle apart, TN, TE, TS and TW, as the maximum field passes through the four cardinal points of the compass.

By arranging the keying or reference impulse produced by the keyer 37 so that the antennas are deenergized at the instant the maximum of the rotating cardioid is due north, for example, a constant reference mark or impulse is established by means of which the phase of the rotating field taken at any point about the center of the field may be determined with respect to the reference or keying mark. Thus, a receiver located due east of the antenna, for example, will receive a signal the modulation of which will vary substantially sinusoidally as the field rotates. At the same time, once during each revolution of the rotating field the signal will be keyed off for an instant and will produce in the receiver a reference impulse the time of which corresponds to the instant the rotating cardioid is pointing due north. For the receiver positioned due east of the antenna it will be appreciated that the maximum of the modulation envelope sine wave will occur 90°, that is, a quarter of a cycle, after the arrival of the timing mark, assuming rotation in a clockwise direction. For a receiver located due south of the antenna the phase of the maximum of the voltage produced by the rotating field will follow the timing mark by 180°. Similarly, in a receiver due west of the antenna the phase of the rotating field will lag the timing mark or impulse by 270°, and in a receiver located due north of the antenna the field will be in phase with the timing impulse.

These phase relations are illustrated in Fig. 11 to which reference is now made. Eight sine wave curves N, NE, E, SE, S, SW, W and NW are shown plotted against a time axis corresponding to one complete revolution of the rotating field. The N curve corresponds to the northward radiation of the antenna, or the corresponding voltage produced in a receiver due north of the antenna. It will be observed that the maximum of this voltage would occur at the time TN, at which instant, however, the field is momentarily reduced to zero to produce the reference mark. The remaining curves correspond similarly to the fields in the other directions, and have their maximums spaced apart 45° so that they occur at successive time intervals TNE, TE, TSE, etc.

The modulator

Referring again to Fig. 1, the modulator for providing accurately spaced timing and calibrating impulses and modulating voltages of controllable phase and amplitude is illustrated in block diagram form in the lower portion of the figure. While the elements which constitute the circuit arrangement illustrated may take many forms, some of which are well known, it is to be understood that the invention is not limited by the particular circuits of the devices which have been illustrated merely to provide full information concerning the operation of this device.

The pulse generator 39, the circuit diagram of which is shown in Fig. 2, is a device for producing a succession of short impulses of the type illustrated in the small diagram immediately above the pulse generator in Fig. 1. The frequency of the output of the pulse generator is preferably eight times the frequency of modulation, and in the present case is 800 impulses per second, since the assumed modulation frequency is 100 cycles per second. By means of a switch 41 the output of the pulse generator 39 may be applied directly to the keyer 37 to modulate the radiated field eight times per cycle if desired. The pulse generator output is also connected to the input circuits of a pair of pulse selectors 43 and 45. The output circuits of the pulse selectors are applied to and control the operation of a square wave generator 47. Output from the first pulse selector 43 is also applied to the keyer 37 through the "one pulse per cycle" contact of the switch 41. A control voltage derived from the output of the voltage supply system, or directly from the filtered output of the square wave generator, is also applied by a lead 50 to the two pulse selectors. Since the elements so far described may not be known generally, they have been illustrated in detail in Figures 2 and 3 and will be described hereinafter.

The output of the square wave generator 47 is applied to three channels. The first channel includes a 90° phase shifter 49, a north-south phase control 51, an amplitude control 53, a differential amplitude control 55, and a tuned amplifier 57, all connected in cascade. The second channel includes an east-west phase control 59, an amplitude control 61, the differential amplitude control 55, and a tuned amplifier 63. The third channel includes a phase shifter 65, a phase control 67, an amplitude control 69, and a tuned amplifier 71. The output of the tuned amplifier 57 in the first channel is connected to the "run" terminal of a run-calibrate switch 73 through which the modulating output voltage is applied to the north-south balanced modulator 23. The output of the tuned amplifier 63 in the second channel is connected to the "run" terminal of another section 75 of the run-calibrate switch by means of which this voltage is applied to the east-west balanced modulator 25. The output of the tuned amplifier 71 in the third channel is connected to the calibrate terminal of still another section 77 of the run-calibrate switch through which this voltage may be applied to the modulator 35 for modulating the omnidirectional antenna 31. The output of the tuned amplifier 57 in the first channel is also connected to the two pulse selectors 43 and 45. This same output is also connected to an east-west reversible adjuster 79, the output of which is fed into a mixer 81. The output of the tuned amplifier 63 is also connected to the input of a north-south reversible adjuster 83, the output of which is also connected to the mixer 81. The output of the mixer 81 is connected to the "run" terminal of the run-calibrate switch 77. Energy is also fed into the mixer 81 from a microphone 83 through a speech amplifier 87. A rejector 89 may be included in the latter connection to eliminate speech frequencies which are near the modulation frequency, 100 cycles, produced by the remainder of the system in order to prevent the speech from interfering with the function of the range.

*Operation of the modulator*

The operation of the modulation voltage supply system will now be explained. As indicated above, the pulse generator 39 supplies a succession of short pulses of energy to the two pulse selectors 43 and 45. As shown in Fig. 3, the input circuits of these pulse selectors contain biased rectifiers 91 and 93, respectively, and are also connected by lead 50 to the output of the tuned amplifier 57 through connection 50. The fixed negative bias of these rectifiers is such that the tubes are normally non-conducting. The bias is substantially equal to or slightly greater than the peak of the sine wave voltage derived from amplifier 57 which is applied to the rectifiers. The control sine wave voltage is applied in phase opposition to the two pulse selectors as indicated by the small curves of Fig. 1 immediately above and below these elements. As a result, the pulse selectors are able to pass only one impulse out of each group of eight generated impulses, the selector 43 taking, for example, pulse No. 1, while pulse selector 45 will pass pulse No. 5 during the alternate half cycle. The two selected impulses, which occur during alternate half cycles of the modulating frequency, are applied to the input circuit of a square wave generator 47, the details of which are also shown in Fig. 3. The square wave generator comprises a pair of tubes 95 and 97 connected in a well-known multivibrator circuit, in which the alternation of conductivity between the two tubes is controlled by the application of the impulses from the pulse selectors. As a result the square wave generator produces a square wave output voltage whose frequency corresponds to that of the sine wave modulating voltage which controls the pulse selectors.

The reason for producing a square wave voltage of this type is that the control of the square wave generator by the selected impulses is much more accurate in phase than that which would be obtained by driving a sine wave oscillator, for example. The square wave voltage is preferably converted to a sine wave by suitable tuned circuits, such as amplifier 57, before it is utilized to modulate the transmitter. The tuned amplifiers for converting the output of the square wave generator to a sine wave may be included before or after the phase shifting and control networks as desired. Extremely stable operation is obtained by using the sine wave representing the fundamental component of the square wave output of the generator 47 to select every fourth impulse for controlling the square wave generator, since this provides automatic synchronization at the proper frequency.

The purpose of the 90° phase shifter 49 is to provide the necessary phase quadrature relation between the modulating voltage for the north-south antenna system and that for the east-west antenna system. While any conventional phase shifting arrangement may be utilized, a preferred circuit is shown in Fig. 4. By utilizing variable resistors in this circuit a coarse adjustment of the phase may be had, which is followed by a second adjuster termed the north-south phase control 51 which provides a further adjustment of the phase. The amplitude control device 53 comprises a well-known potentiometer arrangement in which the amplitude of the voltage in the first channel may be controlled. The potentiometer is coupled to the differential amplitude control 55, the purpose of which is to provide unicontrol means for varying oppositely the amplitudes of the voltages in the first and second channels. The second channel is similar to the first except that the 90° phase shifter 49 is not included.

*Adjustment of radiation in cardinal directions*

The purpose and function of the north-south phase control 51 is illustrated in Fig. 12 to which reference is now made. It will be observed that this phase control device varies the phase of the voltage which modulates the energy radiated by the north-south antenna system. Consequently, the phase of the figure-of-eight field produced by the north-south antenna, with respect to the timing impulse, may be varied one way or the other. Referring to Fig. 6, which is a space diagram of the omnidirectional field 0 and the two figure-of-eight fields, N—S and E—W, it will be observed that the north-south field has no effect in an east-west direction, and that the east-west field does not radiate in a north-south direction. Consequently, shifting the phase of the north-south figure-of-eight field will have no effect on the resultant radiation in an east-west direction. Otherwise stated, and as illustrated in Fig. 12, the adjustment of the north-south phase control 51 shifts the phase of the north and south radiation, curves N' and S', respectively, by the angle $\alpha$, but does not affect the phase of the east-west field, which remains as shown in Fig. 11. While Fig. 12 shows a phase shift in a given direction, it will be appreciated that the phase of the cardioid may also be shifted in the opposite direction. Both fields must move in the same direction at any given time, however. That is, the sum of the north and south phases, $[(0+\alpha)+(180+\alpha)]$, varies but their difference, $[(0+\alpha)-(180+\alpha)]$, remains constant.

The effect of the east-west phase control 59 is similar to that of the north-south phase control 51 but operates on the east-west antenna and therefore does not affect the resultant field in the north-south direction. This is illustrated in Fig. 14. The phase of the resultant field in the north and south positions is normal, as in Fig. 11, but the phase of the resultant or cardioid field in the east and west directions, curves E' and W', has been shifted by the angle γ. As before the sum of the east and west phases is varied, but their difference remains constant.

The phase shift thus produced in the modulation of the radiated field is equivalent to making the rate of rotation of the cardioid non-uniform throughout each revolution. The phase of the field in the north-south direction may be adjusted independently of the phase in east-west direction, and vice versa. The purpose of these adjustments is not to produce the non-uniformity of rotation (or errors α and γ as indicated by Figs. 12 and 14) as a desirable end, but to attain the uniform rotation characterized by the relations of Fig. 11, notwithstanding disssymmetries, of the type referred to above, which produce errors in the directional radiation. If the system may be adjusted in the various quadrants to produce slight errors, it follows that the same system may be used in the same manner to correct preexisting errors which can not otherwise be overcome.

An important feature of the present invention is the provision for advancing the phase of the radiation in the north direction, for example, and retarding the phase of the radiation in the south direction. That is, for varying the difference of the phases in opposite directions, keeping their sum constant. As pointed out above, the phase control devices described immediately above advance or retard the north and south phases in like manner. I have found, however, that the phase of radiation in opposite directions may be varied oppositely by applying to the omnidirectional radiation a controllable amount of the modulation voltage derived from the input to the balanced modulators. Thus, in Fig. 1, the reversible adjusters 79 and 83 select a portion of the quadrature modulating voltages and apply them in controllable phase to a mixer 81. The details of these elements are shown in Fig. 5 to which reference is now made.

The reversible adjusters 79 and 83 are merely potentiometers having their ends cross-connected so that a continuous adjustment may be had between oppositely phased modes of connection. When positioned in the middle of the potentiometers no output voltage is available, while movement in one direction produces a voltage of one phase and movement in the other direction produces a voltage of the opposite phase. These voltages are applied to the omnidirectional radiation modulator 35 through a mixer circuit which may include, for example, a small common impedance Zc fed through large impedances Z from the adjusters 79 and 83, and connected in series with the split secondary of a transformer 99, the primary of which is connected to the speech amplifier 87. These impedances may be adjusted in phase angle to compensate fortuitous phase shift in the modulator 35.

Operating the north-south reversible adjuster 83 causes a modulating voltage to be applied to the omnidirectional radiation, the phase of which corresponds to that applied to the east-west antennas. Since the modulation component of the central antenna is then in phase with the east-west figure-of-eight radiation the only effect in the east-west direction can be a slight change in the amplitude of the resultant modulation, but no change in its phase angle. In the north direction, however, a quadrature relation exists and the phase of the resultant is shifted in a given direction while the phase in the south direction is shifted in the opposite direction. This is illustrated in Fig. 13 in which the east-west curves, not shown, are normal while the north curve, N'', is decelerated, reaching its peak at a time 0+β subsequent to the normal time, and the south curve is accelerated, reaching its peak at a time 180°−β before the normal time. Thus the sum of these radiation phases remains 180°, while their difference is varied by this control. The east-west reversible adjuster 79 is phased with the north-south modulation and for similar reasons shifts the phase of the resultant radiation oppositely by the angles 90°+δ and 270°−δ in the east and west directions but does not affect the phase in the north-south directions. This is illustrated by curves E'' and W'' in Fig. 15.

By manipulating both the phase control devices and the reversible adjusters, it is therefore possible to control independently the phase of radiation in the four cardinal directions, north, south, east and west. Any errors inherent in the antenna system or its surroundings which produce errors in these directions can, therefore, be corrected.

*Adjustment of radiation in intercardinal directions*

The circuit so far described makes possible the control and adjustment of the phase of the modulation of the field radiated in the four cardinal directions. In addition to this, it is necessary to provide means for assuring correct modulation phase in the intercardinal directions. This is the purpose of the differential amplitude control 55, the function of which will now be described in connection with Figures 17 and 18.

When a receiver is northeast of the antenna the field intensity normally reaches a maximum 45° after the reference impulse. In the southeast, southwest and northwest positions the phases of the fields are respectively 135°, 225° and 315° after the timing impulse.

Referring to Fig. 18 the two figure-of-eight radiation patterns N—S and E—W are shown having different maximum amplitudes. Since the fields actually reach maximum at different time intervals, by reason of the quadrature phase relation of the modulating voltages, the maximum amplitude illustrated for the east-west figure-of-eight must be understood to occur 90° after that for the northwest figure-of-eight pattern. When the differential amplitude control is set so that the amplitude of the modulating voltage applied to the north-south antenna exceeds that of the modulating voltage applied to the east-west antenna, the amplitude of the resultant field at the intercardinal points northeast and southwest reaches a maximum before and after, respectively, the time at which maximum would be reached in the normal case where the amplitudes of the two fields are equal. This is equivalent to shifting the phase of the modulation at the intercardinal points, as is illustrated in Fig. 17. The phase of the field in the northeast direction, curve NE', is shifted in the same sense as the phase of the field in the southwest direction, curve SW', while the phase of the field in the southeast direction, curve SE', and in the northwest direction, curve NW', are likewise shifted in similar directions by this adjustment. Consequently, it is possible by manipulating the differential amplitude control device to reduce the average error in the four intercardinal directions, or to make any given intercardinal direction correct, thus making possible a more accurate phasing of the rotating field. It is to be understood, as before, that the purpose of this adjustment is not to create errors but to insure correct operation, even to the extent of overcoming preexisting errors due to inequalities in the mechanical and electrical system.

*Adjustment for receiver calibration*

The purpose of the calibrating switches, which may be connected on a single control shaft, if desired, is to remove the bidirectional fields and to modulate the omnidirectional field with a sine wave modulating voltage, phased so that the maximum field intensity occurs at time TN. This switch may be manually operated upon request to permit the pilot of an airplane to check his receiver, or may be operated automatically at stated intervals as desired. In addition, switch 41 may be operated to modulate the field with eight pulses per revolution. The eight pulses correspond to the four cardinal points of the compass, north, south, east and west, and also the four intercardinal points northeast, southeast, southwest and northwest. The calibration is independent of the position of the aircraft with respect to the transmitter. Regardless of the aircraft position, the pilot receives a series of timing impulses and a modulated field corresponding to that which would be received if he were due north of the transmitter in normal operation. It will be understood that during the above calibration no rotating cardioid is produced since the modulating voltages have been removed from the balanced modulators. The phase shifter 65 provides an initial phase shift to compensate for that of the 90° shifter 49 and the phase shift inherent in the modulator 35 and the phase control 67 provides an operating adjustment whereby the phase of the modulation of the omnidirectional field may be adjusted to the proper value with respect to the timing impulses. This relation is shown in Fig. 16 where the single sine wave curve A has its maximum at the time corresponding to due north, the single curve indicating that the phase of the received voltage is independent of the position of the receiver. Curves B and C, retarded and advanced in phase, respectively, represent the effect of adjusting the phase control 67.

The omnidirectional range herein disclosed thus involves a unique source of modulating voltage which includes means for correcting for errors in the phase of the rotating field at the four cardinal points of the compass and the intercardinal points as well.

I claim as my invention:

1. The method of establishing a radio range which includes the steps of producing an omnidirectional radio frequency field and a pair of directional fields, varying the amplitude of the energy producing said directional fields to vary the intensities of said fields in accordance with voltages which are in substantial phase quadrature relation, combining said fields to produce a resultant directional field which rotates at the frequency of said voltages, and adjusting the relative phases of said voltages to control the angular rotation of said resultant field.

2. The method of establishing a radio range which includes the steps of producing an omnidirectional radio frequency field and a pair of directional fields, varying the amplitude of the energy producing said directional fields to vary the intensities of said fields in accordance with voltages which are in substantial phase quadrature relation to produce a resultant rotating field, and controlling the angular rotation of said resultant field by varying the phases and amplitudes of said voltages.

3. The method of establishing a radio range which includes the steps of producing an omnidirectional radio frequency field and a pair of directional fields, varying the amplitude of the energy producing said directional fields to vary the intensities of said fields in accordance with voltages which are in substantial phase quadrature relation to produce a resultant rotating field, and adjusting the relative amplitudes of said voltages to control the rate of angular rotation of said resultant field.

4. In a radio range having means for producing an omnidirectional radio frequency field and a pair of directional fields, and means for causing the amplitudes of said directional fields to be varied at a predetermined frequency for producing a resultant directional field rotating at said variation frequency, the method of operation which includes the steps of deriving a varying voltage, utilizing said voltage to vary the amplitude of the energy producing said field to vary the intensity of said omnidirectional field, and adjusting the amplitude and phase of said varying voltage to control the angular rotation of said resultant field.

5. In a radio range having means for producing an omnidirectional field and a pair of directional fields and for varying the amplitude of the energy producing said directional fields to vary the intensity of said fields at a given frequency and in relative phase quadrature whereby a rotating directional resultant field is produced, the method of operation which includes the steps of interrupting at least one of said fields once per revolution of said resultant field to establish reference impulses, deriving voltages corresponding in phase to the respective variations of said directional fields, combining said derived voltages, utilizing said combined voltages to vary the amplitude of said omnidirectional field, and adjusting the amplitudes of said derived voltages to adjust the phasing of said resultant field with respect to said reference impulses.

6. In a radio range having means for producing an omnidirectional field and a pair of directional fields and for varying the amplitude of the energy producing said directional fields at a given frequency and in relative phase quadrature so that a rotating directional resultant field is produced, the method of operation which includes the steps of interrupting at least one of said fields once per revolution of said resultant field to establish timed reference impulses, deriving voltages corresponding respectively to the variations of the intensities of said directional fields, combining said derived voltages, utilizing said combined voltages to modulate the amplitude of said omnidirectional field, and adjusting the amplitude and phase of said combined voltage to thereby adjust the phasing of said rotating field with respect to said reference impulses.

7. In combination with an omnidirectional radio range having means for producing a directional radiation field rotating at a predetermined frequency, means for keying said field at the instant said field reaches a maximum in a given direction to establish reference impulses, and means for independently adjusting the phase with respect to said reference impulses of the radiation field in a direction other than said given direction.

8. In combination with an omnidirectional radio range having means for producing a directional radiation field rotating at a predetermined variation frequency, means for keying said field at the instant said field reaches a maximum in a given direction to establish reference impulses, means for independently adjusting the phase, with respect to said impulses, of the intensity variation of said radiation field in a second direction at right angles to said given direction, and means for independently adjusting the phase of the intensity variation of said field in directions intermediate said given direction and said second direction.

9. In combination with a radio range having means for producing an omnidirectional field of carrier frequency and a pair of bidirectional amplitude modulated fields of side band frequency which combine to produce a resultant directional field whose axis of maximum radiation rotates at said modulation frequency, means for keying one of said fields at the instant said axis coincides with a given azimuth to establish reference impulses, means for independently adjusting the phase of modulation of said pair of bidirectional fields, means for causing the amplitude of said omnidirectional field to be varied in accordance with the variations of said bidirectional fields, and means for adjusting the relative intensities of said pair of bidirectional fields.

10. In an omnidirectional radio range having means for producing a directional radiation field rotating in a horizontal plane at a predetermined frequency, means for keying said field once per revolution to establish reference impulses, the phase of the radiation field in any direction being measured by the time said field passes through a maximum in that direction with respect to the time of said reference impulse, means for adjusting the sum of the phases of the radiation field measured in opposite directions, and means for adjusting the difference of the phases of the radiation field measured in opposite directions.

11. In combination, a pair of directional antennas and an omnidirectional antenna, means for energizing said antennas to produce a directional resultant field rotating at a predetermined frequency, means for producing an instantaneous change in the amplitude of said resultant field once for each revolution of said field to produce a reference impulse whereby the azimuth of a receiver with respect to said antennas may be determined by comparing the phase of said rotating field and said reference impulses, and calibrating means for selectably deenergizing said directional antennas and varying the power input to said omnidirectional antenna so that the phase of the omnidirectional field with respect to said reference impulse is constant in all directions.

12. In combination a pair of directional antennas and an omnidirectional antenna, means for energizing said omnidirectional antenna and means for energizing said pair of directional antennas to produce a resultant directional field rotating at a predetermined frequency, means for producing an instantaneous change in the amplitude of said resultant field once for each revolution of said field to produce a reference impulse whereby the azimuth of a receiver with respect to said antennas may be determined by comparing the phase of said rotating field to said reference impulse, means for selectably deenergizing said directional antennas and for varying the power input to said omnidirectional antenna at said frequency, and means for adjusting the relative phase of said omnidirectional field and said reference impulse.

13. In a radio transmitter having means for producing an omnidirectional radiation field and a pair of directional fields which combine to produce a resultant field, the combination of means for deriving two voltages which are in relative phase quadrature, means for utilizing said derived voltages to produce variations in the amplitudes of said directional fields, respectively, and means for controlling the angular rotation of said resultant field by adjusting the amplitudes of said derived voltages.

14. In a radio transmitter having means for producing an omnidirectional radiation field and a pair of directional fields which combine to produce a resultant field, the combination of means for causing the amplitudes of said directional fields to be varied cyclically and in relative phase quadrature to produce a resultant field which rotates at said cyclic frequency, and means for controlling the angular rotation of said resultant field by controlling the degree of amplitude variation of said directional fields.

15. In a radio transmitter having means for producing an omnidirectional radiation field and a pair of directional fields which combine to produce a resultant field, the combination of means for causing the amplitudes of said directional fields to be varied cyclically and substantially in relative phase quadrature to produce a resultant field which rotates at said cyclic frequency, and means for controlling the angular rotation of said resultant field by controlling the said relative phase relation and the degree of amplitude variation of said directional fields.

16. In combination with a radio transmitter having means for producing an omnidirectional radiation field and a pair of directional fields which combine to produce a resultant field, means for deriving voltages of a predetermined frequency, means for utilizing said voltages to cause the amplitudes of said directional fields to be varied cyclically in phase quadrature to produce a rotating directional field, means for adjusting the amplitudes and phases of said derived voltages, means for interrupting at least one of said fields once per revolution of said rotating directional field to establish reference impulses, and means for causing the amplitude of said omnidirectional field to be varied in accordance with said derived voltages to thereby establish the desired phase between the rotating field and said reference impulses at 90 degree intervals in each revolution of said field.

DAVID G. C. LUCK.